STORAGE-STABLE POLYURETHANE PREPOLYMERS CONTAINING MALONITRILE

Yves Bonin and Jean Robin, Lyon, France, assignors to Rhone-Poulenc S.A., Paris, France
No Drawing. Filed Apr. 2, 1970, Ser. No. 25,289
Claims priority, application France, Apr. 4, 1969, 6910477; Nov. 19, 1969, 6939761, 6939762
Int. Cl. C08g 22/04
U.S. Cl. 260—77.5 NC     7 Claims

ABSTRACT OF THE DISCLOSURE

The stability of isocyanate-terminated polyurethane prepolymer compositions derived from a polyhydroxylic polyether is improved by including malonitrile in such compositions.

---

The present invention relates to polyurethane prepolymer compositions with terminal isocyanate groups.

It is known, in the synthesis of polyurethanes, first to prepare prepolymers with terminal isocyanate groups and then to condense these prepolymers, in a subsequent stage, either with water or with polyols, polyamines or aminoalcohols to yield the final polymer. The preparation of the prepolymer is generally effected in the presence of chemical compounds which acts as catalysts or regulators for the urethane group-forming reaction. It is frequently found that the use of such systems does not always prevent the prepolymer gelling during its preparation, and also does not inhibit the tendency of the prepolymer to gel rapidly during storage. Now for certain uses it is advantageous to be able to store polyurethane prepolymers for a certain length of time before they are used. It is thus desirable to be able to produce polyurethane prepolymer compositions which can be prepared without the risk of gelling and which can be kept for a relatively long time without incurring the above-mentioned risk.

It has now been found, and it is this which forms the subject of the present invention, that the storage stability of polyurethane prepolymer compositions with terminal isocyanate groups, and obtained by reaction of a polyhydroxylic polyether with a polyisocyanate, optionally in the presence of catalyst or regulator components, is improved if these compositions contain malonitrile (NC—CH$_2$—CN). The malonitrile can be added during the actual formation of the prepolymer, at any time during the progress of the reaction between the polyhydroxylic polyether and the polyisocyanate and any optional component acting as a catalyst or regulator. Thus it can be added to the reagents when practically no urethane groups have yet formed. The malonitrile can also be added when the prepolymer has been produced but in this case there are serious risks of gelling during the preparation. For this reason it is preferred in practice to add the malonitrile before the precursors of the prepolymers have reacted. It has in effect been found that the malonitrile, in addition to improving the storage stability of the prepolymer, makes it possible to avoid the risks of gelling during the preparation of a prepolymer.

The amount of malonitrile added varies in general from $10^{-3}$ to $3000 \times 10^{-3}$ moles per mole of polyhydroxylic polyether used in forming the prepolymer. However the particularly advantageous preferred limits are from $3 \times 10^{-3}$ to $60 \times 10^{-3}$ mol per mol of polyhydroxylic polyether.

The polyurethane prepolymer can be prepared by any known method, generally in the presence of a catalyst or regulator of the reaction. Amongst these, those described by J. H. Saunders and K. C. Frisch in "Polyurethanes, Chemistry and Technology," part I, pages 210–215 may be mentioned. We have found that if the malonitrile is added to the reagents before any urethane groups have formed, the catalysts which are customary in polyurethane chemistry are very suitable. Amongst these, tertiary amines, heavy metal derivatives, acids and acid chlorides may be mentioned.

We have furthermore found that all gelling of the prepolymer during its preparation is avoided, and that the storage stability of this prepolymer is improved, if the preparation of the prepolymer is carried out in the simultaneous presence of malonitrile, an alkali metal hydroxide or a tertiary amine, and a cobalt, tin, lead, bismuth, iron or zinc derivative. The synergistic effect of this combination, which was not known hitherto, makes it possible to obtain satisfactory reaction speeds as well as improved storage stability. The use of this ternary system constitutes the preferred means of arriving at storage-stable polyurethane prepolymers.

The alkali metal hydroxides which form part of this preferred ternary system are sodium hydroxide, potassium hydroxide and lithium hydroxide. The compounds with tertiary amine groups can be monofunctional or polyfunctional. They are, for example, amines of general formula N(R$_1$)$_3$ in which the radicals R$_1$, which may be identical or different, represent substituted or unsubstituted alkyl groups of 1 to 6 carbon atoms. Furthermore, two radicals R$_1$ can together form a divalent radical and can, together with the nitrogen atom, form an aza-cycloaliphatic ring. More specifically, triethylamine, tributylamine, N-ethylpiperidine and N-methylazacycloheptane may be mentioned.

The tertiary amines can also be compounds of general formula:

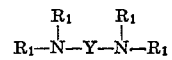

in which the radicals R$_1$, which may be identical or different, have the same significance as above and in which Y represents a substituted or unsubstituted alkylene radical of 1 to 6 carbon atoms. By way of illustration, the following may be mentioned:

N,N'-tetraethyl-1,3-propanediamine,
N,N'-tetraethyl-1,2-propanediamine,
N,N'-tetramethyl-1,4-butanediamine,
N,N'-diethyl-piperazine,
N,N'-diethyl-pyrazolidine, and
1,4-diazo-(2,2,2)-bicyclo-octane.

The heavy metal derivative may be an organic or inorganic salt of cobalt, tin, lead, bismuth, iron or zinc (Saunders, loc. cit., page 165–170). However, because of their greater reactivity, tin salts are preferentially employed. Examples of suitable heavy metal compounds which can be used are: cobalt naphthenate, stannous chloride, dimethyl-tin dichloride, dibutyl-tin dilaurate, lead oleate, ferric chloride and zinc acetylacetonate.

The constituents of this ternary catalyst are used in proportions which can vary within wide limits.

If the basic agent is monofunctional it should in general be present in a proportion of $0.0005 \times 10^{-3}$ to $0.5 \times 10^{-3}$ mol per mol of polyether (preferably $0.005 \times 10^{-3}$ mol to $0.1 \times 10^{-3}$ mol). If the basic agent is polyfunctional (as is the case with tertiary polyamines) these limits are to be understood as applying to each amine radical. The amount of basic agent added to the polyether depends on the initial residual alkalinity or acidity of the polyether used. This determination can be carried out in accordance with the test described by Santi R. Palit [Anal. Chem. 33, No. 10, p. 1441 (1961)]. Where the residual alkalinity of the polyol corresponds to at least $0.0005 \times 10^{-3}$ basic group per molecule of polyol, it is not necessary to add a basic agent. In practice, however, the residual acidity or alkalinity of the polyether introduced is very low so that on adding $0.025 \times 10^{-3}$ equivalents of alkali (hydroxyl or tertiary amine group) per mol of polyether to all the polyethers, adequate alkalinity is achieved.

The amount of heavy metal derivative used depends on its activity. In general amounts such that $0.015 \times 10^{-3}$ metal atom to $1.5 \times 10^{-3}$ metal gram atoms per mol of polyether, and preferably $0.03 \times 10^{-3}$ atom to $0.15 \times 10^{-3}$ metal gram atoms per mol of polyether, are employed.

The heavy metal derivatives can either be introduced in the starting materials themselves, in which they are present as impurities, or they can be added to the mixture of the reagents. The content of heavy metal derivatives can easily be determined in the ash obtained from the reagents, using either X-ray fluorescence or emission spectrography (discussed by Maurice Pinta: Investigation and Determination of Trace Elements, pages 377 and 631). Such methods make it possible to detect metal contents of the order of one p.p.m. (one part per million).

The polyhydroxylic polyethers used should have a molecular weight of between 400 and 10,000, and preferably between 1000 and 500. They are obtained by polycondensation of alkylene oxides in the presence of water or of polyols. Preferably, macrodiols obtained from ethylene oxide, propylene oxide or tetrahydrofuran are used.

The preferred polyisocyanates are the diisocyanates of the formula:

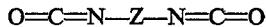

in which Z represents a divalent hydrocarbon radical of 2 to 20 carbon atoms, which may or may not be substituted, and may contain alkylene, cycloalkylene with 5 or 6 carbon atoms in the ring, or phenylene units. These units can be linked by divalent hetero-atom units such as —O— or —S—. Suitable diisocyanates are: hexamethylene diisocyanate, butylene-diisocyanate, 2,4-toluylene - diisocyanate, 2,6 - toluylene - diisocyanate, paraphenylene - diisocyanate, 1,4 - cyclohexylene - diisocyanate, 4,4' - bis - diisocyanato - diphenylmethane and 4,4'-bis-diisocyanato-diphenylether.

The respective amounts of polyisocyanate and hydroxylic polyether are such that more than one isocyanate group is present per hydroxyl group. Whilst a large excess of isocyanate groups is not in itself contra-indicated, it is preferable to use amounts such that the ratio NCO/OH is between 1.05 and 3.

In one of the preferred ways of carrying out the invention malonitrile is directly added to one of the reagents. The polyurethane prepolymer is then obtained by bringing the reagents together, generally in the presence of the catalyst or regulator systems previously defined, at a temperature of between 50 and 150° C.

In the case where the preferred ternary system of the invention is used, the basic agent is added initially optionally in solution, to the polyether. If it is an alkali metal hydroxide, the latter is conveniently introduced as an aqueous or an alcoholic solution. After homogenisation, the water or alcohol is removed by heating to a temperature of 120° to 150° C., under a reduced pressure of about 1 to 10 mm. of mercury. The polyether is then placed under an atmosphere of an inert gas, at atmospheric pressure, and the malonitrile and the heavy metal derivative are added to it. After homogenising the whole, the polyisocyanate is finally rapidly added.

According to a variant of the process it is also possible to add the polyisocyanate, into which the malonitrile and the heavy metal compound have been incorporated, to the polyether containing the basic agent. It is also possible to add the malonitrile, followed by the polyisocyanate, to the polyether. The reaction forming the urethane groups is then generally very slow; but it takes place at a satisfactory speed after the alkaline agent and the heavy metal derivative have been added. The reaction is exothermic and the reagents are kept at a temperature which is generally between 50° and 150° C., so as to complete the reaction forming the prepolymer, which is generally finished after 1 hour to 2 hours at 80° C., without gelling.

The prepolymer compositions of this invention may be used for making polyurethanes in the same way as prior known such compositions containing no malonitrile: for instance as mentioned in the book "Polyurethanes Chemistry and Technology" Part II of J. H. Saunders and K. C. Fristh (Interscience Publisher). The prepolymer compositions can be used to make flexible foams (application in transportations, clothing, furniture, bedding . . .), elastomers (application: tyres, wheels . . .), rigid foams (application in refrigeration, insulation, insulation of pipes and tanks . . .), coatings and adhesives (for wood, metals . . .).

The examples which follow illustrate the invention.

EXAMPLE 1

187.5 g. of polypropylene glycol (alkalinity corresponding to 5 p.p.m. of potassium hydroxide, molecular weight 1875, total content of heavy metals less than 0.4 p.p.m.) and 0.25 ml. of an aqueous solution of potassium hydroxide containing 38.6 g. of potassium per litre are introduced into a 250 ml. reactor equipped with a stainless steel stirrer. The mixture is heated to 130° C. and then placed under a pressure reduced to 1 mm. of mercury for 1 hour. It is allowed to return to atmospheric pressure under an atmosphere of nitrogen, and 56 mg. of dibutyl tin dilaurate, 0.19 g. of malonitrile and 20.88 g. of a mixture containing 80% of 2,4-diisocyanatotoluene and 20% of 2,6-diisocyanatotoluene are then added at 50° C. The temperature rises to 65° C. in 5 minutes. It is then raised to 80° C. and kept at this value. Determinations of isocyanate groups are carried out at intervals:

after 1 hour at 80° C.: 0.0192 NCO group per 100 g.
after 2 hours at 80° C.: 0.0190 NCO group per 100 g.
after 3 hours at 80° C.: 0.0190 NCO group per 100 g.
after 6 hours at 80° C.: 0.0190 NCO group per 100 g.

The prepolymer, which is obtained after one hour at 80° C., is kept at this temperature; it is found that it has not gelled after 10 days' heating.

By way of comparison, various parallel tests were carried out modifying the constituents of the catalyst; it was then found that:

Without a catalyst system the product gels after 1 hour at 80° C.,

On adding only 0.25 ml. of the potassium hydroxide solution, the product gels after 5 minutes, On adding only dibutyl-tin dilaurate the product gels after 45 minutes at 80° C., and On adding only malonitrile and the potassium hydroxide the reaction is very slow: after 6 hours at 80° C., 0.0458 NCO group remains per 100 g.

The heavy metal content of the polypropylene glycol (Fe, Zn, Bi, Co, Pb and Sn) was determined by X-ray fluorescence.

EXAMPLE 2

180 g. of polypropylene glycol (molecular weight 1800) are introduced into a 250 ml. cylindrical reactor. This polypropylene glycol is acid (acidity equivalent to 5 p.p.m. of hydrochloric acid) in the Santi R. Palit test [Anal. Chem. 33, No. 10, p. 144 (1961)] and its heavy metal content is less than 0.4 p.p.m. 0.25 ml. of an aqueous solution of potassium hydroxide containing 38.6 g. of potassium per litre is added to the polyether. The mixture is heated to 130° C. for 1 hour under a pressure of 1 mm. of mercury to dehydrate the polyether. 0.180 g. of malonitrile and 0.054 g. of dibutyl-tin dilaurate are then added, as well as 20.88 g. of a mixture containing 80% of 2,4-diisocyanatotoluene and 20% of 2,6-diisocyanatotoluene.

The reagents are heated to 80° C. and the isocyanate groups are determined. The following is found:

after 30 minutes at 80° C.: 0.0210 NCO group per 100 g.
after 1 hour at 80° C.: 0.0202 NCO group per 100 g.
after 2 hours at 80° C.: 0.0200 NCO group per 10 g.
after 6 hours at 80° C.: 0.198 NCO group per 100 g.

The prepolymer is then kept at 80° C. It is found that it has not gelled after 10 days' heating.

EXAMPLE 3

The procedure of Example 2 is followed, with the same reagents but replacing the aqueous potassium hydroxide solution by 0.036 g. of 1,4-diazo-(2,2,2)-bicyclooctane. The procedure of Example 2 is followed (without the 1 hour's heating at 130° C. under 1 mm. of mercury) and the isocyanate groups are determined; the following is found:

after 30 minutes at 80° C: 0.0211 NCO group per 100 g.
after 1 hour at 80° C: 0.0205 NCO group per 100 g.
after 2 hours at 80° C.: 0.0205 NCO group per 100 g.
after 6 hours at 80° C.: 0.0203 NCO group per 100 g.

After 10 days at 80° C., it is found that the prepolymer has not gelled.

EXAMPLE 4

195 g. of polypropylene glycol (molecular weight 1875) which is acid (acidity equivalent to 5 p.p.m. of hydrochloric acid) to the Santi R. Palit test are introduced into a 250 ml. reactor. 0.025 ml. of a 0.990 N aqueous potassium hydroxide solution is added. The mixture is dehydrated for 1 hour at 130° C. under a pressure of 1 mm. of mercury. After cooling to 60° C., 0.195 g. of malonitrile, 0.010 g. of dibutyl-tin dilaurate and 50 g. of 4,4'-diisocyanato-diphenylmethane are added. The reagents are heated to 80° C. and the isocyanate groups are determined; the following is found:

after 10 minutes at 80° C.: 0.0772 NCO group per 100 g.
after 1 hour 30 minutes at 80° C.: 0.0770 NCO group per 100 g.
after 6 hours at 80° C.: 0.0770 NCO group per 100 g.

The prepolymer is kept at 80° C. and it is found that it has not gelled after 10 days' heating.

EXAMPLE 5

100 g. of a commercial polyether designated by the name "Pluracol TP 440" (manufactured by Wyandotte) are introduced into a 250 ml. reactor. (The polyether was obtained by condensing propylene oxide with trimethylolpropane and has a hydroxyl number of 415.) After adding 0.13 ml. of an aqueous potassium hydroxide solution containing 38 g. of potassium per litre, this polyether is heated to 130° C. over the course of 45 minutes under a pressure of 1 mm. of mercury.

In another 250 ml. reactor, 87 g. of a mixture containing 80% of 2,4-diisocyanatotoluene and 20% of 2,6-diisocyanatotoluene is introduced; 0.021 g. of dibutyl-tin dilaurate and 0.14 g. of malonitrile are added, the whole is heated to 40° C. and 69.5 g. of the preceding polyether are introduced over the course of 15 minutes. This introduction is carried out in such a way that the temperature does not exceed 60° C. The temperature is raised to 80° C. and after 1 hour at this temperature it is found that the mixture contains 12.9% by weight of isocyanate groups. After 4 hours at this temperature this content is still 12.9%. After 10 days at 80° C. it is found that the prepolymer has not gelled.

The same test was carried out without adding the catalyst system. After adding the diisocyanate, the product gelled after 30 minutes.

EXAMPLE 6

174 g. of polypropylene glycol of molecular weight 1740, with a total heavy metals content (iron, zinc, bismuth, cobalt, lead and tin) of less than 0.4 p.p.m. are introduced into a 250 cm.³ reactor. 0.23 cm.³ of an aqueous potassium hydroxide solution containing 33.4 g. of potassium per litre is added. The mixture is heated to 130° C. and kept at this temperature for 1 hour under a reduced pressure of 2 mm. of mercury. The mixture is cooled to about 60° C. and 0.174 g. of malonitrile, 0.052 g. of zinc acetylacetonate and 20.9 g. of a mixture of diisocyanatotoluene containing the two 2,4- and 2,6-isomers in the proportions of 80–20 are added.

The whole is heated to 80° C. and it is found that the prepolymer is finished after 1 hour (content of NCO groups/100 g.: 0.0218). On keeping the prepolymer at 80° C., it is found that it has not gelled after 10 days.

The determination of the heavy metals content of the polypropylene glycol was carried out by X-ray fluorescence.

EXAMPLE 7

0.193 g. of a 27% strength aqueous ferric chloride solution and 174 g. of polypropylene glycol (as used in Example 6) are introduced into a 250 cm.³ reactor. The mixture is heated to 130° C. and kept under a pressure reduced to 2 mm. of mercury for 30 minutes. The mixture is cooled to about 90° C., 0.23 cm.³ of an aqueous potassium hydroxide solution containing 38.4 g. of potassium per litre is added and the whole is again heated to 130° C. for 1 hour under a pressure of 1 to 2 mm. of mercury. The mixture is cooled to about 90° C. and then to 65° C., 0.174 g. of malonitrile and 21.0 g. of diisocyanatotoluene (as used in Example 1) are added, and the whole is heated to 80° C. After 30 minutes the content of free NCO groups is 0.0242%. The prepolymer is kept at 80° C. It is found that it has not gelled after 10 days' heating.

EXAMPLE 8

0.042 g. of malonitrile and 158 g. of diisocyanatotoluene (as used in Example 1) are introduced into a 250 cm.³ reactor. 44 g. of Napiol R 101 (branched polyether containing 0.856 OH group/100 g., sold by Naphtachimie, of average molecular weight 600, containing about 10 p.p.m. of zinc determined by X-ray fluorescence and giving a slightly alkaline reaction to the Santi R. Palit test) are introduced into a second reactor. Thereafter this polyether is rapidly poured into the reactor containing the diisocyanate and malonitrile. The mixture of the reagents is then heated and kept at 80° C. It is found that the prepolymer is finished after 1 hour's heating (NCO content/100 g.: 0.707). The prepolymer is kept at 80° C. and it is found that it has not gelled after 14 days, whilst the NCO content is still 0.624 group/100 g.

EXAMPLE 9

0.040 g. of malonitrile and 160 g. of diisocyanatotoluene (as used in Example 1) are introduced into a 250 cm.³ reactor and stirred under dry nitrogen, and 40 g. of Napiol SP 800 (branched polyether containing 0.895 OH/100 g., sold by Naphtachimie, basic to the Santi R. Palit test and containing 10 p.p.m. of zinc) are run in over the course of 48 minutes. The temperature of the mixture rises from 24° to 36° C. at the end of the addition of the Napiol. The whole is then heated to 80° C. and the change in the content of free NCO groups as a function of the time is followed. It is found that the prepolymer is finished after 1 hour's heating (0.744 NCO group/100 g.). The prepolymer is kept at 80° C. It is found that the product has not gelled after 13 days' heating whilst the free NCO content is 0.621 NCO group/100 g.

EXAMPLE 10

187.5 g. of polypropylene glycol (molecular weight 1875), 0.19 g. malonitrile, 0.036 g. of 1,4-diaza-(2,2,2)-bicyclo-octane, 56 mg. of dibutyl-tin dilaurate and 20.88 g. of a mixture containing 80% of 2,4-diisocyanatotoluene and 20% of 2,6-diisocyanatotoluene are introduced into a 250 cm.³ reactor. The reagents are heated to 80° C. and it is found that the prepolymer is finished after 1 hour's heating. This prepolymer has not gelled after 10 days' heating.

EXAMPLE 11

497 g. of diisocyanatotoluene (as used in Example 1) are introduced into a 500 cm.³ reactor and 132.1 g. of Napiol R 101 (polyether of Example 8) are introduced at a uniform speed over the course of 3 hours 35 minutes at 62–65° C., with stirring. The reagents are then heated to 70° C. and it is found that the prepolymer is finished after 30 minutes' heating. The material is rapidly cooled to 36° C. and 200 g. of the prepolymer are withdrawn and 0.042 g. of malonitrile added thereto. After homogenisation, the prepolymer is kept at 80° C. and it is found that it has not gelled after 14 days. The prepolymer fraction which has not been stabilised has gelled after 10 hours' heating at 80° C.

EXAMPLE 12

158 g. of diisocyanatotoluene (consisting of a mixture of the two 2,4- and 2,6-isomers in the proportions of 80/20) and 0.0237 g. of octoyl chloride are introduced into a 250 cm.³ reactor, and 42 g. of a polyhydroxylic polyether Napiol R 101 (see Example 8) are introduced over the course of 3 hours 50 minutes at about 60° C. The octoyl chloride added renders the medium acid (Santi R. Palit test). The prepolymer is finished by heating for 30 minutes to 70° C. 0.042 g. of malonitrile is then added, the mixture is homogenised and the prepolymer is kept at 80° C. After 14 days' heating it is then found that the prepolymer has not gelled.

On repeating the same experiment without adding malonitrile, it is found that the prepolymer has gelled after 5 days at 80° C.

EXAMPLE 13

158 g. of diisocyanatotoluene (as used in Example 12) and 0.042 g. of malonitrile are introduced into a 250 cm.³ reactor. Secondly, 42 g. of Napiol R 101 (see Example 8) are taken and a stream of hydrochloric acid gas is bubbled through this material so that the acidity of the medium is $4 \times 10^{-3}$ mol of hydrochloric acid per 100 g. of Napiol. The acidified Napiol is then poured into the mixture of diisocyanatotoluene+malonitrile, kept at about 60° C., over the course of 45 minutes. The reaction mixture is heated to 80° C. and it is found that the prepolymer is finished after 30 minutes' heating. On being kept at 80° C., the composition thus obtained has not gelled after 21 days' heating.

We claim:

1. A polyurethane prepolymer composition containing terminal isocyanate groups and chains derived from a polyhydroxylic polyether having a molecular weight between 400 and 10,000, obtained by reacting an organic polyisocyanate with the polyhydroxylic polyether, said prepolymer containing malonitrile.

2. The improvement of claim 1 in which the malonitrile is present in a proportion of $10^{-3}$ to $3000 \times 10^{-3}$ moles per mole of polyhydroxylic polyether used in forming the prepolymer.

3. The composition of claim 1 wherein said prepolymer is prepared in the presence of a regulator or catalyst for the urethane group-forming reaction.

4. The improvement of claim 3 in which the said regulator or catalyst is a basic agent which is an alkali metal hydroxide or tertiary amine, combined with a derivative of cobalt, tin, lead, bismuth, zinc or iron.

5. The improvement of claim 4 in which $0.0005 \times 10^{-3}$ to $0.5 \times 10^{-3}$ equivalents of the basic agent and $0.015 \times 10^{-3}$ to $1.5 \times 10^{-3}$ metal gram atoms per mol of the polyether used in forming the prepolymer are used.

6. The improvement of claim 1 in which the polyether used in forming the prepolymer is polypropylene glycol or a polyoxypropylenated trimethylolpropane of molecular weight 1000 to 5000.

7. The improvement of claim 1 in which the polyisocyanate used in forming the prepolymer is hexamethylene diisocyanate, butylene diisocyanate, 2,4-toluylene diisocyanate, 2,6-toluylene diisocyanate, p-phenylene-diisocyanate, 1,4-cyclohexylene diisocyanate, 4,4'-bis-diisocyanatodiphenylmethane, or 4,4'-bis-diisocyanatodiphenyl ether.

References Cited

UNITED STATES PATENTS

| | | | |
|---|---|---|---|
| 3,179,625 | 4/1965 | Ehrhart | 260—77.5 |
| 3,250,745 | 5/1966 | Davis et al. | 260—77.5 |
| 3,317,463 | 5/1967 | Schonfeld et al. | 260—77.5 |
| 3,454,621 | 7/1969 | Engel | 260—77.5 |
| 2,801,990 | 8/1957 | Seeger et al. | 260—77.5 |
| 2,883,729 | 7/1954 | Seeger et al. | 260—77.5 |

OTHER REFERENCES

"Theoretical Principles of Organic Chemistry," by Huckel, Elsevier Publishing Co. (1955), p. 360.

DONALD E. CZAJA, Primary Examiner

E. C. RZUCIDLO, Assistant Examiner

U.S. Cl. X.R.

260—2.5 BB, 45.9 R, 77.5 A, 77.5 AP, 77.5 R, 77.5 TB